United States Patent
Brands (10) Patent No.: US 10,237,063 B2
(45) Date of Patent: Mar. 19, 2019

(54) DISTRIBUTED CRYPTOGRAPHIC KEY INSERTION AND KEY DELIVERY

(71) Applicant: NXP B.V., Eindhoven (NL)

(72) Inventor: Jan Rene Brands, Nijmegen (NL)

(73) Assignee: NXP B.V., Eindhoven (NL)

( * ) Notice: Subject to any disclaimer, the term of this patent is extended or adjusted under 35 U.S.C. 154(b) by 197 days.

(21) Appl. No.: 15/377,840

(22) Filed: Dec. 13, 2016

(65) Prior Publication Data

US 2018/0167210 A1 Jun. 14, 2018

(51) Int. Cl.
*H04L 9/08* (2006.01)
*H04W 12/04* (2009.01)
*G06Q 20/34* (2012.01)

(52) U.S. Cl.
CPC ......... *H04L 9/0869* (2013.01); *G06Q 20/355* (2013.01); *H04L 9/0866* (2013.01); *H04L 9/0877* (2013.01); *H04W 12/04* (2013.01); *H04L 2209/805* (2013.01)

(58) Field of Classification Search
CPC ..... H04L 9/0861; H04L 9/083; H04L 9/0838; H04L 9/0643; H04L 9/0877; H04L 9/0866; H04W 12/04; G06Q 20/355
See application file for complete search history.

(56) References Cited

U.S. PATENT DOCUMENTS

| | | | | |
|---|---|---|---|---|
| 7,558,969 B1 * | 7/2009 | Lucero | ..................... | G06F 21/73 438/18 |
| 7,590,236 B1 * | 9/2009 | Boneh | ................. | H04L 63/0428 380/277 |
| 7,987,358 B1 * | 7/2011 | Walstrum, Jr. | ........ | G06F 21/123 380/278 |
| 8,094,823 B1 * | 1/2012 | Sun | ........................ | H04L 9/0841 380/282 |
| 2003/0023849 A1 | 1/2003 | Martin, Jr. et al. | | |
| 2004/0006404 A1 * | 1/2004 | McAdams | ............. | G11C 16/20 700/115 |
| 2004/0170068 A1 * | 9/2004 | Williams | ................ | G06F 21/73 365/200 |
| 2004/0228484 A1 * | 11/2004 | Yanagisawa | .......... | H04L 9/3013 380/44 |
| 2004/0252830 A1 * | 12/2004 | Chen | ................... | H04L 63/0442 380/30 |
| 2005/0066175 A1 * | 3/2005 | Perlman | .............. | H04L 63/0428 713/176 |

(Continued)

FOREIGN PATENT DOCUMENTS

EP 2388948 A1 11/2011
EP 2273718 A1 12/2011

*Primary Examiner* — Darren B Schwartz (57) ABSTRACT

A method of producing a secure integrated circuit (IC), including: loading the IC with a unique identification number (UID); loading the IC with a key derivation data (KDD) that is based upon a secret value K and the UID; producing a secure application configured with a manufacturer configuration parameter (MCP) and the secret value K and configured to receive the UID from the IC; producing a manufacturer diversification parameter (MDP) based upon the MCP and the secret value K and loading the MDP into the IC; wherein secure IC is configured to calculate a device specific key (DSK) based upon the received MDP and the KDD, and wherein the secure application calculates the DSK based upon the MCP, K, and the received UID.

20 Claims, 3 Drawing Sheets

(56) References Cited

U.S. PATENT DOCUMENTS

| | | | |
|---|---|---|---|
| 2005/0084114 A1* | 4/2005 | Jung | H04L 9/0847 380/278 |
| 2005/0172137 A1* | 8/2005 | Hopkins | G06Q 20/02 713/185 |
| 2006/0215837 A1* | 9/2006 | Chen | H04L 9/0847 380/44 |
| 2006/0225126 A1* | 10/2006 | Brown | H04L 63/062 726/2 |
| 2007/0095927 A1 | 5/2007 | Pesonen | |
| 2007/0223704 A1* | 9/2007 | Brickell | H04L 9/0841 380/281 |
| 2007/0282749 A1* | 12/2007 | Nonaka | G11B 20/00086 705/51 |
| 2008/0159539 A1* | 7/2008 | Huang | H04L 9/0866 380/277 |
| 2009/0296924 A1* | 12/2009 | Oksman | H04L 9/083 380/30 |
| 2010/0172503 A1* | 7/2010 | Neumann | H04L 9/0866 380/282 |
| 2010/0205443 A1* | 8/2010 | Zhao | H04L 9/0841 713/171 |
| 2011/0055556 A1* | 3/2011 | Choi | H04L 9/006 713/156 |
| 2011/0293093 A1* | 12/2011 | Sun | H04L 9/0833 380/211 |
| 2014/0006738 A1* | 1/2014 | Nagai | G06F 21/44 711/163 |
| 2014/0064480 A1* | 3/2014 | Hartley | H04L 9/0866 380/30 |
| 2014/0082359 A1* | 3/2014 | Nakhjiri | H04L 9/0822 713/168 |
| 2014/0122897 A1 | 5/2014 | Dodeja et al. | |
| 2015/0163056 A1* | 6/2015 | Nix | H04L 9/0869 380/46 |
| 2016/0134419 A1* | 5/2016 | Smith | H04L 9/0833 380/30 |
| 2018/0152454 A1* | 5/2018 | Kwon | H04L 63/045 |

* cited by examiner

DISTRIBUTED CRYPTOGRAPHIC KEY INSERTION AND KEY DELIVERY

TECHNICAL FIELD

Various exemplary embodiments disclosed herein relate generally to distributed cryptographic key insertion and key delivery, for example, for use in the internet of things (IoT).

BACKGROUND

Securing an IoT product means that an IoT service provider will want to perform actions such as authentication of a specific device and exchanging confidential messages securely with a specific device. To accomplish this, the devices of an IoT product are provided with device-individual cryptographic keys during manufacturing. Such need for the secure exchanging of keys is found in other manufactured devices.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of producing a secure integrated circuit (IC), including: loading the IC with a unique identification number (UID); loading the IC with a key derivation data (KDD) that is based upon a secret value K and the UID; producing a secure application configured with a manufacturer configuration parameter (MCP) and the secret value K and configured to receive the UID from the IC; producing a manufacturer diversification parameter (MDP) based upon the MCP and the secret value K and loading the MDP into the IC; wherein secure IC is configured to calculate a device specific key (DSK) based upon the received MDP and the KDD, and wherein the secure application calculates the DSK based upon the MCP, K, and the received UID.

Various embodiments are described wherein the secure application is implemented on a smart card.

Various embodiments are described wherein $KDD=UID^K$ mod p and p is a large prime number.

Various embodiments are described wherein $MDP=MCP^K$ mod p.

Various embodiments are described wherein the IC calculates DSK as: $DSK=KDD \cdot MDP$ mod p.

Various embodiments are described wherein the secure application calculates DSK as: $DSK=UID^K \cdot MCP^K$ mod p.

Various embodiments are described wherein $KDD=K^{UID}$ mod n, wherein K is the secret message in an RSA algorithm and $n=p \cdot q$ where p and q are large prime numbers.

Various embodiments are described wherein $MDP=MCP$ mod$(p-1)(q-1)$.

Various embodiments are described wherein the IC calculates DSK as: $DSK=KDD^{MDP}$ mod n.

Various embodiments are described wherein the secure application calculates DSK as: $DSK=K^{MDP \cdot UID}$ mod n.

Various embodiments are described wherein the IC and the secure application receive a product specific parameter (PSP) from a customer using the IC.

Various embodiments are described wherein the IC and the secure application apply a one way function (OWF) to the DSK with the PSP as an input to the OWF.

Various embodiments are described wherein the OWF is a hash function.

Various embodiments are described wherein a method of producing a secure integrated circuit (IC), including: loading the IC with a key derivation data (KDD) that is secret and randomly chosen; loading the IC with a unique identification number (UID) based upon KDD and generator g; loading the IC with a product specific parameter (PSP) from a device manufacturer; producing a secure application configured with a manufacturer configuration parameter (MCP) and configured to receive the UID from the IC and a private secret key (PSK) from the device manufacturer; wherein secure IC is configured to calculate a device specific key (DSK) based upon the received PSP and the KDD, and wherein the secure application calculates the DSK based upon the MCP, PSK, and the received UID.

Various embodiments are described wherein the secure application is implemented on a smart card.

Various embodiments are described wherein $UID=g^{KDD}$ mod p and p is a large prime number.

Various embodiments are described further comprising calculating a manufacturer diversification parameter (MDP), wherein $MDP=g^{MCP}$ mod p.

Various embodiments are described wherein $PSP=MDP^{PSK}$ mod p.

Various embodiments are described wherein the IC calculates DSK as: $DSK=PSP^{KDD}$ mod p.

Various embodiments are described wherein the secure application calculates DSK as: $DSK=UID^{MCP \cdot PSK}$ mod p.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

This disclosure proposes a simple, easy to use and secure means for device manufacturers, e.g., IoT manufacturers, to accomplish providing a manufactured product with device-individual cryptographic keys during manufacturing without additional overhead in their manufacturing process and without needing to rely on trusted third parties.

Securing an IoT product or IoT service means that an IoT service provider will want to perform actions such as authenticating a specific IoT device and exchanging confidential messages with a specific IoT device. In order to provide good security, each IoT device may be provided with device-individual (e.g., unique) cryptographic keys during manufacturing to accomplish this objective. As a result, compromise of one device, which may lead to exposure of the keys it contains, should not affect the security of other devices.

However, this leads to the following questions and results in overhead for the device manufacturer: How to securely generate the keys? How to secure the key insertion process? Is a secure environment needed within the device manufacturing area for this? How to store the keys securely for later use? How to transport the keys securely to where they are needed? How to keep track of which keys are being used, which ones have expired or are blacklisted? This is complicated, time consuming, and expensive for IoT manufacturers to do correctly and to do securely. While the methods of securing manufactured devices are described using the example of IoT devices, such methods may be applied to other devices.

Current smart card manufacturers have experience with secure key insertion for their smart card IC products. However, the so-called trust provisioning service that these manufacturers provide is built on the assumption that they have a direct trust relationship with the customer who is going to use the produced ICs. In fact, the customer may order directly from the manufacturer smart card ICs that are customized and provided with key material according to the customer's specifications. The manufacturer may then configure its key insertion process to provide the right key data to the individual ICs during the wafer test step of the manufacturing process. Afterwards, the keys themselves are provided to the customer (or their representative) through, key delivery process, for example, an on-line system through which the keys may be obtained.

The situation with IoT-related products is quite different. The manufacturer manufactures these ICs which are typically sold to distributors. It is these distributors who sell the ICs to the actual customers who integrate them into their product designs. So there is typically no direct contact between the manufacturer and their final customers who use the manufacturer's ICs, and therefore there is also no direct trust relationship between the manufacturer and the customer. Because of this business model, the ICs are also not customized for a typical customer. They are generic ICs that are all functionally identical.

Securing an IoT device seems therefore a task that completely rests with the IoT manufacturer, who typically has limited experience and resources available for this. At the same time, it is the IC manufacturer who has the required experience and a process implemented to provide security for IoT devices.

Figure 1:
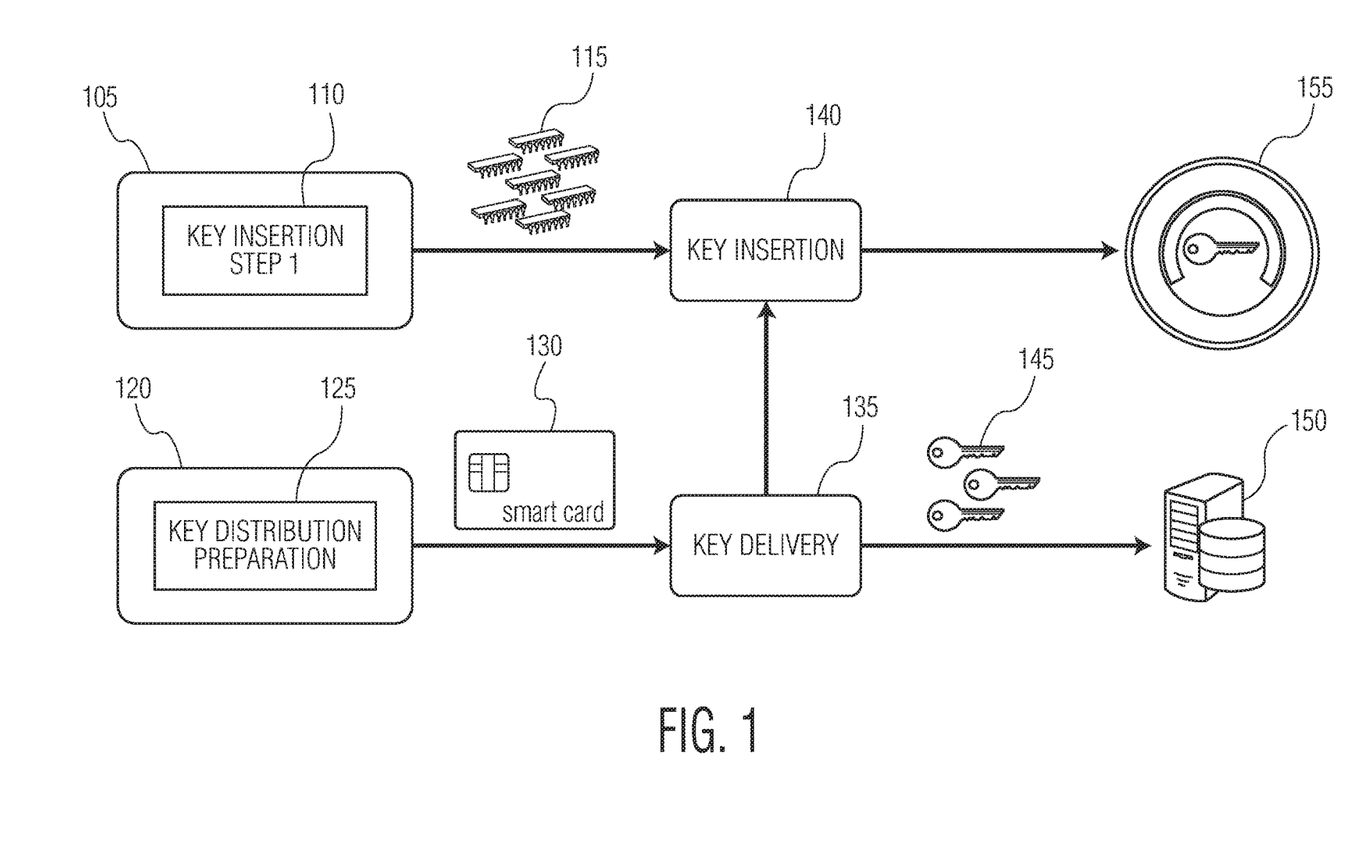
FIG. 1 illustrates an embodiment of the process of inserting and distributing keys in IoT devices.

FIG. 1 illustrates an embodiment of the process of inserting and distributing keys in IoT devices. Embodiments are described herein that address the problem described above by distributing the key insertion process between the IC manufacturer and the customer or manufacturer of the IoT device and by moving the key delivery process entirely to the customer. This is done in such a way that the manufactures will have no knowledge about the keys that are present inside the ICs that the customer put in their devices. Also no other party (except the customer themselves), such as distributors, other customers of the same type of IC, and other external parties, can access or gain knowledge of these keys.

During manufacturing 105 of the ICs 115, the manufacturer provides each IC 115 with die-individual secret information and a die-individual identification number 110. When a customer has bought these ICs 115 from a distributor, the customer can then request from the manufacturer a secure smart card 130 containing a smart card application that is configured with a customer-specific parameter and secret key information (known only to the manufacturer). The manufacturer may have a key distribution preparation process 125 that will be handled by the customer support department. Other similar customer-facing departments may be used to accomplish this function as well. During IoT device manufacturing, the customer then performs a key delivery process 135 that provides each IC with this customer-specific parameter and with a product-specific parameter that the customer defines themselves. Further, the key delivery process 135 may provide the customer-specific die-individual keys 145 to a service provider 150 that will interact with the IoT device 155. The customer-specific parameter and product-specific parameters are inserted 140 into the ICs 115 during device manufacturing. The parameter insertion 140 may be carried out by the customer themselves or by a contract manufacturer. This results in an IoT device 155 containing the customer-specific device-specific key (DSK).

The IC 115 then computes from all this information a device-specific secret key. The smart card 130 can calculate the same secret key, using the product-specific parameter and the IC's identification number as inputs, and output that to the customer. As a result, only the IC 115 and the customer will know the resulting secret key and can then use this key to secure their on-line transactions.

As described above, the key insertion process may be divided into two steps: a preparation step performed at the IC manufacturer; and a finalization step performed during IoT device testing at the IoT device manufacturer (the customer).

As a result, the key delivery process may be moved entirely to the customer. To accomplish this, the customer may request from the IC manufacturer a smart card that is loaded by the IC manufacturer with customer-unique configuration data.

Figure 2:
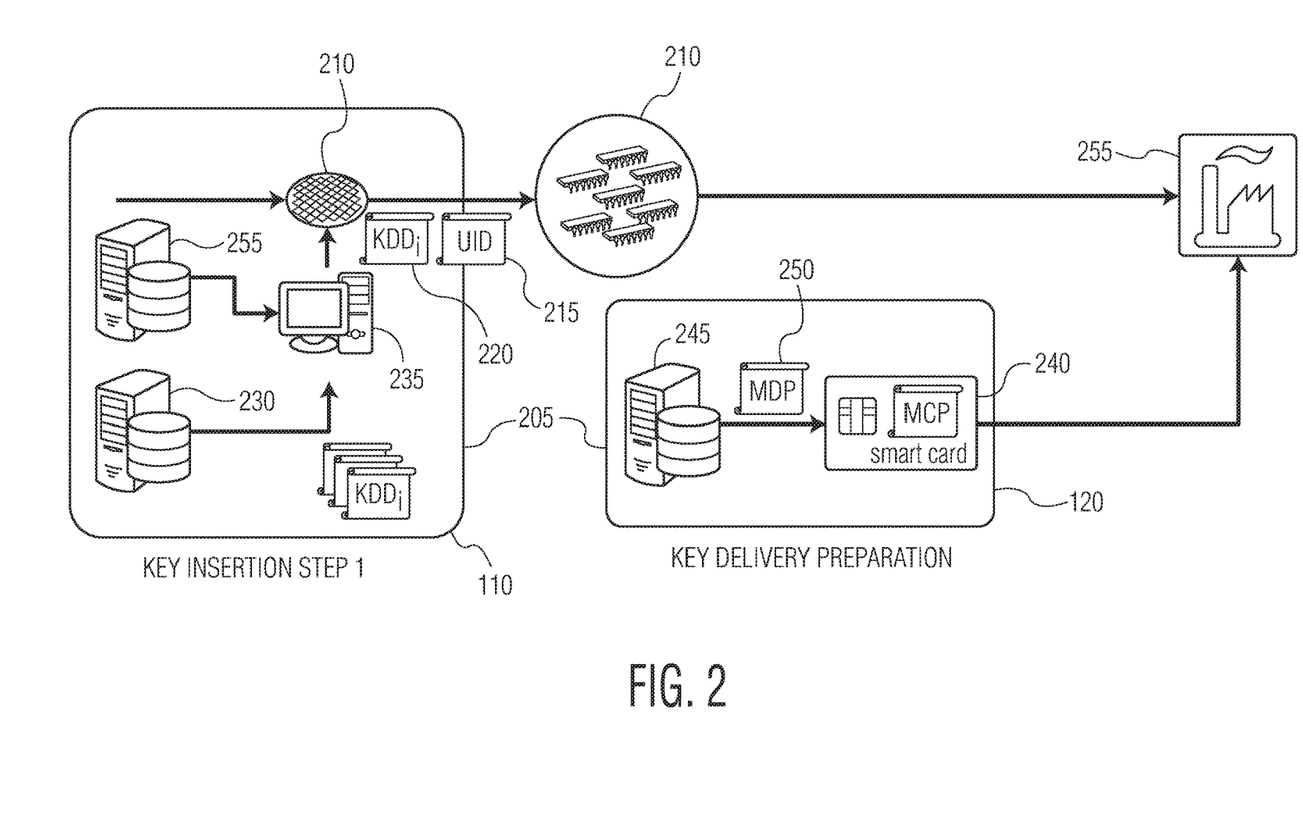
FIG. 2 illustrates the key insertion and delivery as performed by the IC manufacturer.

FIG. 2 illustrates the key insertion and delivery as performed by the IC manufacturer. During the preparation step of the Key Insertion process 110 at the IC manufacturer 205, each IC 210 is loaded with a Unique Identification number (UID) 215 and die-individual Key Derivation Data (KDD) 220 by a wafer tester 235. The UID 215 may, for example, be a serial number containing or based on a manufacturer code, a product code, a batch number, or a wafer number and die wafer co-ordinates to uniquely identify a particular die. The wafer tester 235 may receive the UID 215 from a UID database 225 and the KDD 220 from a key insertion server 230. The details on how to construct the KDD will be discussed below. In other embodiments, the UID may be derived in other ways that are described in greater detail below.

When a customer 255 wants to provision their IoT devices with device-individual keys, they may request a smart card 240 from the IC manufacturer 205 for that purpose. The IC manufacturer 205 will register the request from that customer and establish their identity. Next, the IC manufacturer 205 will prepare a smart card 240 (for example a smart card containing a secure smart card IC running a secure operating system) with a specific smart card application. A smart card configuration server 245 may configure this application with a Manufacturer Configuration Parameter (MCP) 250. After this configuration step, the smart card application will no longer accept other MCPs 250. The customer 255 is then provided a customer-specific Manufacturer Diversification Parameter (MDP) that is derived from the MCP 250.

Figure 3:
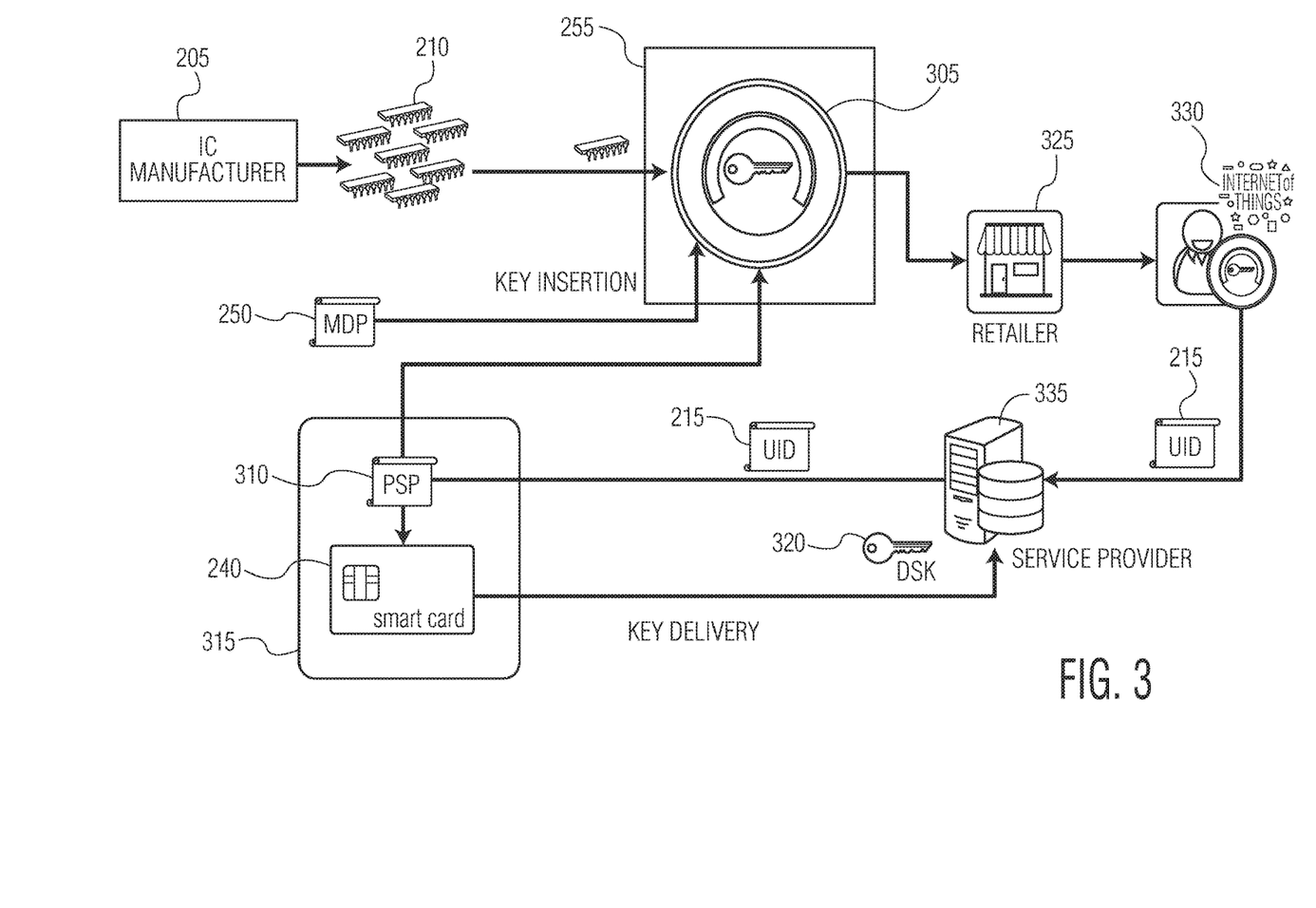
FIG. 3 illustrates the key delivery and key insertion process.

The customer 255 may buy a certain number of a particular kind of IC 210 from a distributor for integration into one of their products. The distributor typically has bought those ICs from the IC manufacturer 205 directly. During device manufacturing, these ICs are mounted on a PCB that will be put inside the manufactured device 305.

During the finalization step of the key insertion process at the customer 255, each device is loaded with the MDP 250 that is provided to the customer 255 by the IC manufacturer 205 and a Product Specific Parameter 310 (PSP) generated by the customer. The PSP 310 (see FIG. 3) is essentially a random number used by the customer 255 to identify the particular type of product that is being manufactured. It is not shared by the customer 255 with the IC manufacturer 205 or anyone else. As further described below, the MDP and PSP may be derived and used in other ways as well.

The MDP and the PSP will be loaded by the newly manufactured device 305 into the IC 210 during its first start-up, for example during the device test sequence in the manufacturing process.

FIG. 3 illustrates the key delivery and key insertion process. For the key delivery, the customer 255 requests from the IC manufacturer 205 a smart card 240 that will be configured by the IC manufacturer as described above. The smart card 240 will be delivered to the customer 255 in a secured manner, for example by courier in a tamper-evident envelope. The customer 255 will need to keep the smart card 240 in an access-controlled area 315 to ensure that no unauthorized parties have access to its functionality.

The manufactured device 305 may be sold by a retailer 325 to an end user 330. Whenever the end user 330 wants to make use of the service provided by a Service provider 335, the end user 330 submits the UID 215 of the IC 210 in the manufactured device 305 to a Service provider 335 that supports his device. The service provider 335 sends the UID 215 to the smart card 240. The smart card 240 will then calculate the DSK 320, based on the UID 215 and output the DSK 320 to the service provider 335. The service provider 335 then uses the DSK 320 to authenticate the device and set up a secure communication channel to it to securely personalize the device and register it for use with its service.

The step of obtaining the DSKs 320 may be performed off-line when the UIDs 215 of the ICs 210 have been obtained and stored during manufactured device 305 testing. In that way a collection of DSKs 320 may be calculated before any of the manufactured devices 305 are on-line. Otherwise, a manufactured device 305 will have to send its UID 215 via the service provider 335 when it is on-line so that the UID 215 may be passed on to the smart card 240. The DSK 320 may then be calculated by the smart card 240 based on this input.

A key derivation method will now be described. Both the ICs 210 and the smart card 240 implement a so-called Key Derivation Function (KDF). The $KDF_{IC}$ is the KDF inside the ICs 210, and the $KDF_{SC}$ is the KDF inside the smart card 240. $KDF_{IC}$ and $KDF_{SC}$ are constructed in such a way that they enable an IC 210 and the smart card 240 to calculate the same DSK.

Each IC A calculates its individual $DSK_A$ using the $KDF_{IC}$ with $KDD_A$, MDP, and PSP as inputs. Given the input of the MCP, PSP, and the $UID_A$ of a particular IC A, the smart card can calculate $DSK_A$ of IC A using $KDF_{SC}$. So for the two key derivation functions to produce the same $DSK_A$ the two key derivation functions have to satisfy the following relation:

$$KDF_{IC}(KDD_A, MDP, PSP) = KDF_{SC}(MCP, UID_A, PSP)$$

The question becomes how to find key derivation functions that satisfy this relation and result in a secure system. One way of solving this problem is to assume that $KDD_A$ is the result of a function that has as its inputs $UID_A$ and a secret key K, only known to the IC manufacturer, and the MDP is the result another function with inputs MCP and K:

$$KDD_A = f(K, UID_A),$$

$$MDP = g(K, MCP).$$

Then the relation between the KDFs becomes:

$$KDF_{IC}(f(K, UID_A), g(K, MCP), PSP) = KDF_{SC}(MCP, UID_A, PSP)$$

The PSP parameter will be disregarded for now, and a way to find a solution for this equation is to find functions h and j such that for most (or all) k, u and c:

$$h(f(k, u), g(k, c)) = j(c, u).$$

A trivial solution for this is to take for f, g, h and j the XOR function (bitwise addition: $\oplus$), then clearly $$(k \oplus u) \oplus (k \oplus c) = (k \oplus k) \oplus (u \oplus c) = c \oplus u.$$

However, this solution is not secure. An attacker may find a way to extract the KDD out of one of the ICs. Knowing the UID, it then becomes trivial to calculate the secret key K as $K = UID \oplus KDD$, thereby compromising the security of the product.

It becomes clear from this that a kind of one-way function (OWF) for f is needed such that an attacker cannot derive the secret key K from the resulting KDD. The same is true for g with respect to MDP.

A solution is to use exponentiation modulo a large prime number p as a OWF:

$$f(k, u) = u^k \bmod p, g(k, c) = c^k \bmod p$$

and use multiplication modulo p for h:

$$h(x, y) = x \cdot y \bmod p.$$

Define j as:

$$j_k(c, u) = c^k \cdot u^k \bmod p,$$

then $$h(f(k, u), g(k, c)) = f(k, u) \cdot g(k, c) \bmod p$$
$$= u^k \cdot c^k \bmod p$$
$$= c^k \cdot u^k \bmod p$$
$$= j_k(c, u)$$

So if the secret key K is programmed into the smartcard the same key may be calculated by both key derivation functions. This may be accomplished by setting:

$$MDP = MCP^K \bmod p,$$

$$KDD = UID^K \bmod p,$$

then in the smart card:

$$DSK = MCP^K \cdot UID^K \bmod p,$$

and in the IC:

$$DSK = KDD \cdot MDP \bmod p = UID^K \cdot MCP^K \bmod p.$$

Given the KDD, p, and the UID, an attacker cannot extract the key K, as this amounts to solving the so-called discrete logarithm problem; a mathematical problem considered to be too difficult to solve for large enough primes p. On the other hand, without knowing K, one cannot compute KDD, so the DSK can only be computed inside the IC and the smart card.

A variation on this solution is to use the RSA algorithm with K as the private exponent and a modulus n=p·q, the product of two large primes. The security of K, given KDD, rests then on the security of the RSA signature scheme (which in turn relies on the difficulty of factoring large numbers).

Another solution possibility is the following. Set $$f(k,u) = k^u \bmod n,$$

$$g(k,c) = k^c \bmod n,$$

$$h(x,y) = x^y \bmod n,$$

$$j_k(c,u) = k^{u \cdot g(k,c)} \bmod n,$$

where the modulus n=p·q, the product of two large primes. Then $$h(f(k, u), g(k, c)) = f(k, u)^{g(k,c)} \bmod n$$
$$= (k^u)^{g(k,c)} \bmod n$$
$$= k^{u \cdot g(k,c)} \bmod n$$
$$= j_k(c, u).$$

So, again, if the secret key K is programmed into the smartcard the same key may be calculated by both key derivation functions. This may be accomplished by setting:

$$MDP = MCP \bmod (p-1)(q-1),$$

$$KDD = K^{UID} \bmod n,$$

then in the smart card the following may be calculated:

$$DSK = K^{MDP \cdot UID} \bmod n$$

and in the IC:

$$DSK = KDD^{MDP} \bmod n$$
$$= (K^{UID})^{MDP} \bmod n$$
$$= K^{UID \cdot MDP} \bmod n.$$

Given the KDD, n, and the UID an attacker cannot extract the key K, as this amounts to cracking the RSA algorithm. Note that instead of storing both K and MDP inside the smartcard, the smartcard may store the intermediate result $k = K^{MDP} \bmod n$ instead. This has the additional advantage that the secret key K is also not available in plain inside the smart card, because extracting K from k, n, and MDP also amounts to cracking the RSA algorithm.

In the above description, the parameter PSP was ignored. However, now that there are several solutions to arrive at the same DSK in both the smart card and the IC, it becomes easy to mix in PSP into the result. As PSP is provided as an input to both the IC and the smart card, they may use a OWF in the following way $$DSK_{final} = OWF(DSK, PSP).$$

Good choices for the OWF are well-known and commonly used cryptographic hash functions such as SHA-2, SHA-3 (Keccak), or RIPEMD-160, where the inputs DSK and PSP may be concatenated as byte arrays to form one single input.

Additional key derivation mechanisms will now be described. Each mechanism will include the following steps: setup step, steps for each IC, steps for each IC manufacturer, device manufacturer steps, steps inside the IC, and steps inside the smart card.

Setup:
Choose large prime p (public)
Choose generator $g \in_\mathcal{R} \mathbb{Z}_p$
For each IC:
Choose random $KDD \in_\mathcal{R} \mathbb{Z}_p$ Calculate $UID = g^{KDD} \bmod p$ For each manufacturer:
Choose $MCP \in_\mathcal{R} \mathbb{Z}_p$ Calculate $MDP = g^{MCP} \bmod p$ IoT device manufacturer:
Choose $PSK \in_\mathcal{R} \mathbb{Z}_p$ Calculate $PSP = MDP^{PSK} \bmod p$ Inside the IC:

Calculate $DSK = PSP^{KDD} \bmod p$

Store DSK
Inside the Smart Card:

Calculate $k = UID^{MCP} \bmod p$

Calculate $DSK = k^{PSK} \bmod p$

Output DSK

It is noted that a similar construction may also be done using Elliptic Curves instead of modular arithmetic.

A proof that this works is as follows. The IC calculates:

$$DSK_{IC} = PSP^{KDD} \bmod p$$
$$= (MDP^{PSK})^{KDD} \bmod p$$
$$= (g^{MCP})^{PSK \cdot KDD} \bmod p$$
$$= g^{MCP \cdot PSK \cdot KDD} \bmod p,$$

while the smart card calculates:

$$DSK_{SC} = k^{PSK} \bmod p$$
$$= (UID^{MCP})^{PSK} \bmod p$$
$$= (g^{KDD})^{MCP \cdot PSK} \bmod p$$
$$= g^{MCP \cdot PSK \cdot KDD} \bmod p.$$

So $DSK_{IC}=DSK_{SC}$, and both the smart card and the IC calculate the same key. This key is unique to the IC: i.e., each IC will calculate a different key.

The advantage of this solution is that it directly incorporates the parameter PSP into the calculations. The cryptographic scheme itself is a 3-party variant of the well-known Diffie-Hellman scheme. It is considered to be just as secure as ordinary Diffie-Hellman.

A potential disadvantage is that anyone can generate a pair (MCP, MDP), given the prime p. This does not affect the security of the scheme, but it limits the control that the IC manufacturer can exercise over the use of the scheme. To ensure that a customer properly protects their MCP value, it is preferable that the IC manufacturer may ensure that it is always securely stored inside secure device, e.g., a smart card.

Incorporating control over the generation of the pair (MCP, MDP) into the scheme could be done as follows.

Setup:
Choose large prime p, elliptic curve $E(\mathbb{Z}_p)$ of order (prime) n (public)
Choose a generator $G \in_\mathcal{R} E(\mathbb{Z}_p)$ (public)
Choose random Product Key $PK \in_\mathcal{R} \mathbb{Z}_n$ (secret)
For each IC:
Choose random $KDD \in_\mathcal{R} \mathbb{Z}_n$ Calculate $UID=(KDD+PK) \cdot G$ For each manufacturer:
Choose $MCP \in_\mathcal{R} \mathbb{Z}_n$ Calculate $MDP=MCP \cdot G$ Calculate $Z=-(MCP \cdot PK) \cdot G$ IoT device manufacturer:
Choose $PSK \in_\mathcal{R} \mathbb{Z}_n$ Calculate $PSP=PSK \cdot MDP$ Inside the IC:

Calculate $DSK=KDD \cdot PSP$

Store DSK
Inside the Smart Card:

Calculate $DSK=(PSK \cdot MCP)UID+PSK \cdot Z$

Output DSK

It is noted, that a similar construction can also be done using modular arithmetic instead of Elliptic Curves.

A proof that this works is as follows. The IC calculates:

$$DSK_{IC} = KDD \cdot PSP$$
$$= (KDD \cdot PSK \cdot MCP) \cdot G$$

while the smart card calculates:

$$DSK_{SC} = (PSK \cdot MCP)UID + PSK \cdot Z$$
$$= (PSK \cdot MCP \cdot (KDD+PK)) \cdot G + PSK \cdot Z$$
$$= (PSK \cdot MCP \cdot KDD + PSK \cdot MCP \cdot PK) \cdot$$
$$G - (PSK \cdot MCP \cdot PK) \cdot G$$
$$= (PSK \cdot MCP \cdot KDD) \cdot G = (KDD \cdot PSK \cdot MCP) \cdot G$$

So $DSK_{IC}=DSK_{SC}$, and both the smart card and the IC calculate the same key. This key is unique to the IC: i.e., each IC will calculate a different key. The security of this scheme relies on the Elliptic Curve Discrete Logarithm problem, which is considered to be intractable.

The advantage of this solution is that it directly incorporates the parameter PSP into the calculations and only the IC manufacturer may calculate the value Z, as it relies on the knowledge of the secret Product Key PK.

A disadvantage of this scheme is that if someone reverse-engineers a single one of the ICs, they may be able to recover the value KDD for that IC. This in turn can lead to the recovery of the value PK·G. While this does not expose PK itself, it is enough to allow the calculation of a Z given a pair (MCP, MDP). So it eliminates the control by the IC manufacturer over the scheme.

This issue may be addressed as follows:

Setup:
Choose large prime p, elliptic curve $E(\mathbb{Z}_p)$ of order (prime) n (public)
Choose a generator $G \in_\mathcal{R} E(\mathbb{Z}_p)$ (public)
Choose random $PK \in_\mathcal{R} \mathbb{Z}^*_n$ (secret)
For each IC:
Choose random $k \in_\mathcal{R} \mathbb{Z}_n$ Calculate $KDD=k \cdot PK \bmod n$ Calculate $UID=k \cdot G$ For each manufacturer:
Choose $MCP \in_\mathcal{R} \mathbb{Z}_n$ Calculate $MDP=(MCP \cdot PK^{-1}) \cdot G$ IoT device manufacturer:
Choose $PSK \in_\mathcal{R} \mathbb{Z}_n$ Calculate $PSP=PSK \cdot MDP$ Inside the IC:

Calculate $DSK=KDD \cdot PSP$

Store DSK
Inside the Smart Card:

Calculate $DSK=(PSK \cdot MCP) \cdot UID$

Output DSK

A proof that this works is as follows. The IC calculates:

$$DSK_{IC} = KDD \cdot PSP$$
$$= (k \cdot PK \cdot PSK) \cdot MDP$$
$$= (k \cdot PK \cdot PSK \cdot MCP \cdot PK^{-1}) \cdot G$$
$$= (k \cdot PSK \cdot MCP) \cdot G,$$

while the smart card calculates $$DSK_{SC} = (PSK \cdot MCP) \cdot UID$$
$$= (PSK \cdot MCP \cdot k) \cdot G.$$

So $DSK_{IC}=DSK_{SC}$, and both the smart card and the IC calculate the same key. This key is unique to the IC: each IC will calculate a different key. The security of this scheme relies on the Elliptic Curve Discrete Logarithm problem, which is considered to be intractable.

The advantage of this solution is that it directly incorporates the parameter PSP into the calculations and only the IC manufacturer may calculate the value MDP, as it relies on the knowledge of the secret Product Key PK.

A disadvantage of this scheme is that if someone reverse-engineers a number of these ICs, they may be able to recover the value PK. So it would eliminate the control by the IC manufacturer over the scheme.

An improvement is to move the PK-dependent values to the smart card, as follows:

Setup:
Choose large prime p, elliptic curve $E(\mathbb{Z}_p)$ of order (prime) n and a generator $G \in_{\mathcal{R}} E(\mathbb{Z}_p)$ (all public)
Choose random $PK \in_{\mathcal{R}} \mathbb{Z}^*_n$ (secret)
For each IC:
Choose random $KDD \in_{\mathcal{R}} \mathbb{Z}_n$ Calculate UID=(PK·KDD)G For each manufacturer:
Choose $m \in_{\mathcal{R}} \mathbb{Z}_n$ Calculate $MCP = m \cdot PK^{-1} \bmod n$ Calculate MDP=m·G IoT device manufacturer:
Choose $PSK \in_{\mathcal{R}} \mathbb{Z}_n$ Calculate PSP=PSK·MDP Inside the IC:

Calculate DSK=KDD·PSP

Store DSK
Inside the Smart Card:

Calculate DSK=(PSK·MCP)·UID

Output DSK
A proof that this works is as follows. The IC calculates:

$$DSK_{IC} = KDD \cdot PSP$$
$$= (KDD \cdot PSK) \cdot MDP$$
$$= (KDD \cdot PSK \cdot m) \cdot G,$$

while the smart card calculates:

$$DSK_{SC} = (PSK \cdot MCP) \cdot UID$$
$$= (PSK \cdot m \cdot PK^{-1} \cdot PK \cdot KDD) \cdot G$$
$$= (KDD \cdot PSK \cdot m) \cdot G$$

So both the IC and the smart card calculate the same IC-specific key. The security of this scheme relies on the Elliptic Curve Discrete Logarithm problem, which is considered to be intractable.

Only the IC manufacturer may calculate the value MCP, as it relies on the knowledge of the secret Product Key PK.

A disadvantage of this scheme is that if someone were to obtain and reverse-engineer a number of these Smart Cards, they may be able to recover the value $PK^{-1}$, which would end the control by the IC manufacturer over the scheme.

Even though it may be less likely that someone would be able to perform such an attack, the scheme can be improved upon as follows:

Setup:
Choose large prime p, elliptic curve $E(\mathbb{Z}_p)$ of order (prime) n and a generator $G \in_{\mathcal{R}} E(\mathbb{Z}_p)$ (all public)
Choose random $PK \in_{\mathcal{R}} \mathbb{Z}^*_n$ (secret)
For each IC:
Choose random $KDD \in_{\mathcal{R}} \mathbb{Z}_n$ Calculate UID=(KDD·PK)·G For each manufacturer:
Choose $MCP \in_{\mathcal{R}} \mathbb{Z}_n$ Calculate MDP=(MCP·PK)·G IoT device manufacturer:
Choose $PSK \in_{\mathcal{R}} \mathbb{Z}_n$ Calculate PSP=PSK·MDP Inside the IC:

Calculate DSK=KDD·PSP

Store DSK
Inside the Smart Card:

Calculate DSK=(PSK·MCP)·UID

Output DSK
It is noted that a similar construction can also be done using modular arithmetic instead of Elliptic Curves.

A proof that this works is as follows. The IC calculates:

$$DSK_{IC} = KDD \cdot PSP$$
$$= (KDD \cdot PSK) \cdot MDP$$
$$= (KDD \cdot PSK \cdot MCP \cdot PK) \cdot G,$$

while the smart card calculates:

$$DSK_{SC} = (PSK \cdot MCP) \cdot UID$$
$$= (PSK \cdot MCP \cdot KDD \cdot PK) \cdot G.$$

So both the IC and the smart card calculate the same IC-specific key. The security of this scheme relies on the Elliptic Curve Diffie-Hellman problem, which is considered to be intractable.

For optimal security, PK may be chosen such that PK·G is a generator of $E(\mathbb{Z}_p)$.

The key derivation methods described above have several advantages. A security advantage is that a successful attack on a single IC can only ever reveal confidential data that is specific to that IC. So data gained in that way cannot be used to compromise or attack the security of other ICs of the same type.

As different device manufacturers will receive differently configured smart cards, a manufacturer cannot misuse their smart card to generate DSKs for another manufacturer's devices.

If the PSP is kept confidential by the device manufacturer, there is no way the IC manufacturer can determine or calculate the DSK of customer's devices. So there is no need for the customer (the device manufacturer) to have put complete trust in the internal processes, procedures and people within the IC manufacturer.

Other parties, who do not have access to the PSP and/or the smart card, have no way whatsoever to determine the DSKs for a manufacturer's devices, even if they have access to the ICs before they are integrated into the devices (this is the case with e.g., distributors).

The described key derivation methods also have the advantage that during device manufacturing (e.g., during device test) there is no need for two-way communication between the newly manufactured device and a (secure) back-end (owned by the device manufacturer or the service provider or the IC manufacturer). This would present a severe potential bottleneck in the production, as the manufacturing throughput would become dependent on the availability of such a back-end system.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, key delivery systems described herein may include a computer implementing a computer program. Such system, may also include other hardware elements including storage, network interface for transmission of data with external systems as well as among elements of the key delivery systems.

In an embodiment of the invention, the computer program may include computer program code adapted to perform all the steps of a method according to the invention when the computer program is run on a computer. Preferably, the computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of producing a secure integrated circuit (IC), comprising:
    loading, by a wafer tester, the secure IC with a unique identification number (UID), wherein the UID uniquely identifies a particular die, and wherein the UID is not equivalent to zero mod p;
    loading, by the wafer tester, the secure IC with die-individual key derivation data (KDD) that is based upon a secret value K and the UID;
    configuring, with a smart card configuration server, a secure application configured with a manufacturer configuration parameter (MCP) and the secret value K and configured to receive the UID from the secure IC;
    producing a manufacturer diversification parameter (MDP) based upon the MCP and the secret value K; and
    loading the MDP into the secure IC; wherein the secure IC is configured to calculate a device specific key (DSK) based upon the received MDP and the die-individual KDD, and the secure application calculates the DSK based upon the MCP, the secret value K, and the received UID, to allow a service provider to securely communicate with the secure IC and both the secure IC and the secure application calculate an identical DSK.

2. The method of claim 1, wherein the secure application is implemented on a smart card.

3. The method of claim 1, wherein the $KDD=UID^K$ mod p and p is a large prime number.

4. The method of claim 3, wherein the $MDP=MCP^K$ mod p.

5. The method of claim 4, wherein the secure IC calculates the DSK as: $DSK=KDD \cdot MDP$ mod p.

6. The method of claim 5, wherein the secure application calculates the DSK as: $DSK=K^{MDP \cdot UID}$ mod n.

7. The method of claim 4, wherein the secure application calculates the DSK as: $DSK=UID^K \cdot MCP^K$ mod p.

8. The method of claim 1, wherein the $KDD=K^{UID}$ mod n, wherein K is the secret value in a Rivest Shamir Adleman (RSA) algorithm and $n=p \cdot q$ where p and q are large prime numbers.

9. The method of claim 8, wherein the $MDP=MCP$ mod$(p-1)(q-1)$.

10. The method of claim 9, wherein the secure IC calculates the DSK as: $DSK=KDD^{MDP}$ mod n.

11. The method of claim 1, wherein the secure IC and the secure application receive a product specific parameter (PSP) from a customer using the secure IC.

12. The method of claim 11, wherein the secure IC and the secure application apply a one way function (OWF) to the DSK with the PSP as an input to the OWF.

13. The method of claim 12, wherein the OWF is a hash function.

14. A method of producing a secure integrated circuit (IC), comprising:
    loading the secure IC with a key derivation data (KDD) that is secret and randomly chosen;
    loading the secure IC with a unique identification number (UID) based upon the KDD, wherein the UID uniquely identifies a particular die and generator g, and wherein the UID is not equivalent to zero mod p;
    loading the secure IC with a product specific parameter (PSP) from a device manufacturer;
    producing a secure application configured with a manufacturer configuration parameter (MCP) and configured to receive the UID from the secure IC and a private secret key (PSK) from the device manufacturer; wherein the secure IC is configured to calculate a device specific key (DSK) based upon the received PSP and the KDD, and the secure application calculates the DSK based upon the MCP, the PSK, and the received UID, to allow a service provider to securely communicate with the secure IC and both the secure IC and the secure application calculate an identical DSK.

15. The method of claim 14, wherein the secure application is implemented on a smart card.

16. The method of claim 14, wherein the $UID=g^{KDD}$ mod p and p is a large prime number.

17. The method of claim 14, further comprising:
calculating a manufacturer diversification parameter (MDP), wherein the $MDP = g^{MCP} \mod p$.

18. The method of claim 17, wherein the $PSP = MDP^{PSK} \mod p$.

19. The method of claim 14, wherein the secure IC calculates the DSK as: $DSK = PSP^{KDD} \mod p$.

20. The method of claim 14, wherein the secure application calculates the DSK as: $DSK = UID^{MCP \cdot PSK} \mod p$.

* * * * *